United States Patent
Arnold

(10) Patent No.: US 9,471,650 B2
(45) Date of Patent: Oct. 18, 2016

(54) SYSTEM AND METHOD FOR CONTEXTUAL WORKFLOW AUTOMATION

(71) Applicant: Fyre LLC, Orlando, FL (US)

(72) Inventor: Timothy Kyle Arnold, Oviedo, FL (US)

(73) Assignee: Fyre LLC, Orlando, FL (US)

( * ) Notice: Subject to any disclaimer, the term of this patent is extended or adjusted under 35 U.S.C. 154(b) by 112 days.

(21) Appl. No.: 14/292,165

(22) Filed: May 30, 2014

(65) Prior Publication Data

US 2015/0347529 A1    Dec. 3, 2015

(51) Int. Cl.
*G06F 17/30*    (2006.01)

(52) U.S. Cl.
CPC ... *G06F 17/30554* (2013.01); *G06F 17/30424* (2013.01)

(58) Field of Classification Search
None
See application file for complete search history.

(56) References Cited

U.S. PATENT DOCUMENTS

| | | | |
|---|---|---|---|
| 5,950,190 A * | 9/1999 | Yeager | G06F 17/30572 |
| 6,052,735 A | 4/2000 | Ulrich et al. | |
| 6,094,649 A | 7/2000 | Bowen et al. | |
| 6,236,996 B1 | 5/2001 | Bapat et al. | |
| 7,068,775 B1 * | 6/2006 | Lee | H04M 3/428 379/265.02 |
| 7,302,430 B1 * | 11/2007 | Nagda | G06Q 10/06 |
| 7,783,645 B2 | 8/2010 | Hess et al. | |
| 8,214,265 B2 | 7/2012 | Peters | |
| 8,442,982 B2 | 5/2013 | Jacobson et al. | |
| 8,452,809 B2 * | 5/2013 | Nagda | G06Q 10/06 707/776 |
| 8,504,530 B2 | 8/2013 | Namini | |
| 2007/0192358 A1 * | 8/2007 | Nagda | G06Q 10/06 |
| 2009/0055553 A1 | 2/2009 | Chasman et al. | |
| 2010/0261488 A1 * | 10/2010 | Little | H04L 12/1886 455/466 |
| 2011/0009133 A1 * | 1/2011 | Hung | H04L 12/1886 455/466 |
| 2011/0225232 A1 | 9/2011 | Casalaina et al. | |
| 2011/0225495 A1 | 9/2011 | Casalaina et al. | |
| 2011/0320400 A1 | 12/2011 | Namini | |
| 2012/0084135 A1 * | 4/2012 | Nissan | G06Q 30/06 705/14.38 |
| 2012/0117116 A1 | 5/2012 | Jacobson et al. | |
| 2012/0179762 A1 | 7/2012 | Arora et al. | |
| 2013/0009752 A1 | 1/2013 | Finkenzeller et al. | |
| 2013/0055078 A1 | 2/2013 | Berger et al. | |

OTHER PUBLICATIONS

"Drag & Tag Joins Bullhorn Marketplace", retrieved May 29, 2014 from http://www.prweb.com/releases/Drag_and_Tag_Joins_/Bullhorn.

(Continued)

*Primary Examiner* — Hung Le
(74) *Attorney, Agent, or Firm* — Foley & Lardner LLP

(57) ABSTRACT

A program product, system and method, the program product comprising a non-transitory computer-readable medium, comprising computer program code comprising instructions to perform the method: receiving active content, where the active content comprises computer code for configuring a display in a first display interface; automatically matching without user intervention selected data from the active content to target category data; when there is a match, extracting data from the active content that matches object selector data, including a unique key; searching a customer database of database records using the unique key; when no records found, automatically creating new record; when one record is found, automatically updating without user intervention, items within the database record; when multiple records found, automatically determining a primary database record and automatically updating the primary database record; creating and displaying data in a second display interface from the records.

22 Claims, 6 Drawing Sheets

(56) References Cited

OTHER PUBLICATIONS

"How do I add an attachment?" Retrieved May 29, 2014 from https://ebsta.zendesk.com/entries/24013053-How-do-I.

How do I create a keyboard shortcut to open the Ebsta window? Retrieved May 29, 2014 from https://ebsta.zendesk.com/entries/42726696-How-do-I-create-a-keyboard-shortcut-to-open-the-Ebsta-window-.

"How do I view Activities History?" Rerieved May 29, 2014 from https://ebsta.zendesk.com/entries/25810317-How-do-I-view-Activities-History-.

"It would be great if you could . . . ". Retrieved May 29, 2014 from https://ideas.ebsta.com/forms/171332-ebsta-for-bullhorn/suggestions.

"What websites is Ebsta optimized for?" Retrieved May 29, 2014 from https://ebsta.zendesk.com/entries/40875758-What-websites-is-Ebsta-optimized-for-.

Gulick, "Ebsta for Talent Rover Helps Streamline the Staffing and Recruitment Workflow." Retrieved May 29, 2014 from http://www.talentrover.com/2014/04/03/ebsta-talent-rover-helps-streamline-staffing-recruitment-workflow/.

Homepage, "Ebsta—The Chrome Plugin for Salesforce," retrieved May 29, 2014 from http://www.ebsta.com/.

* cited by examiner

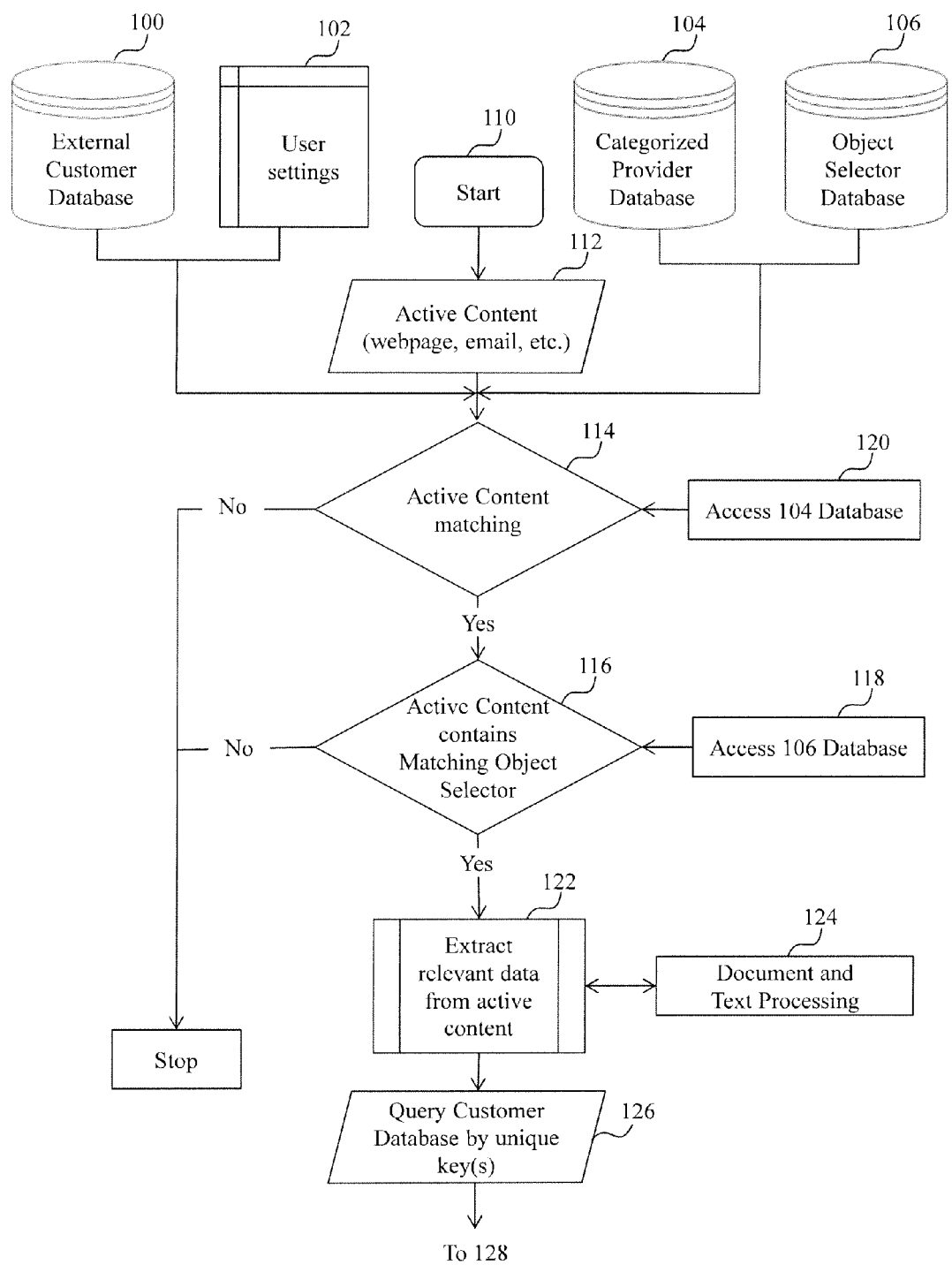

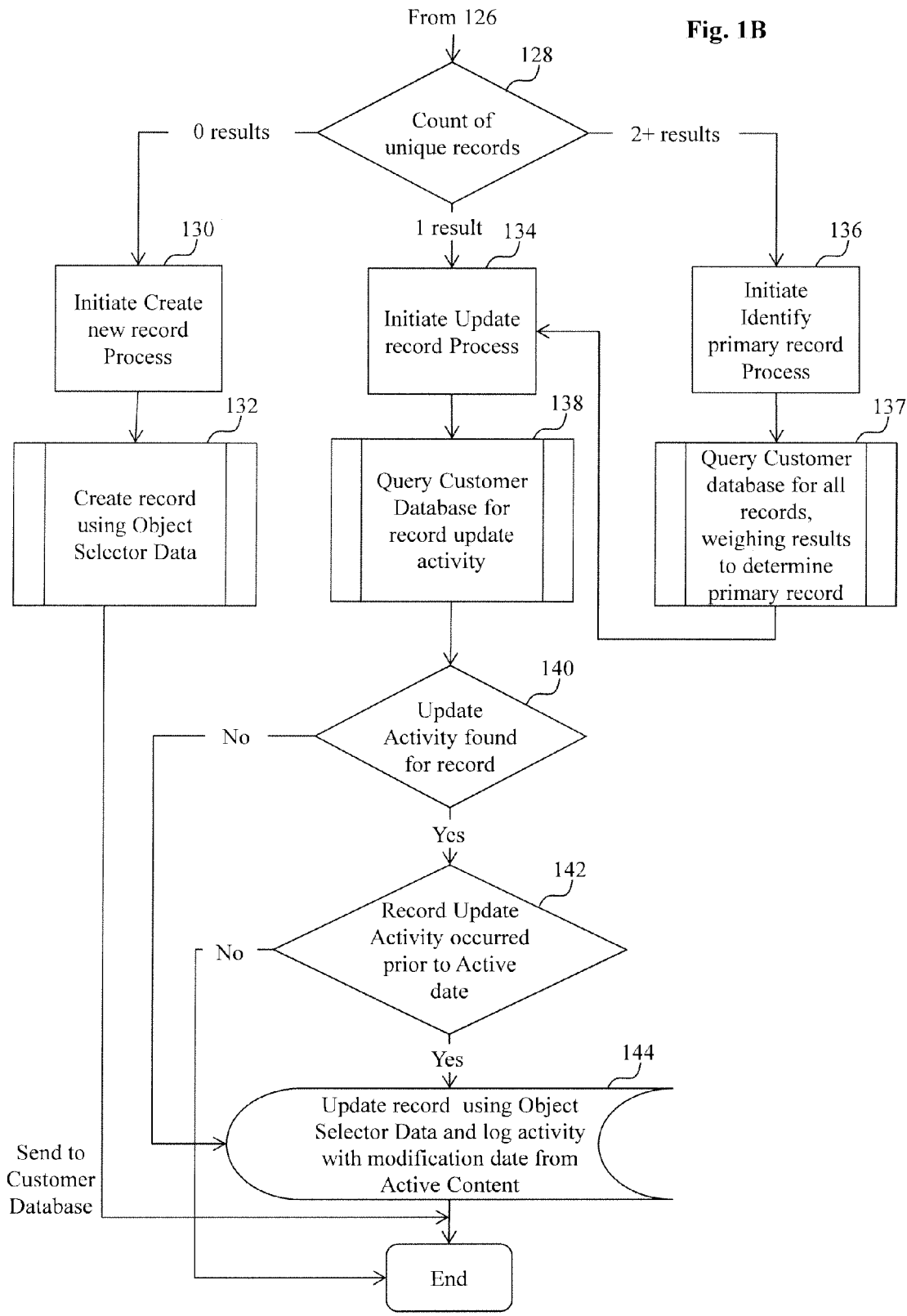

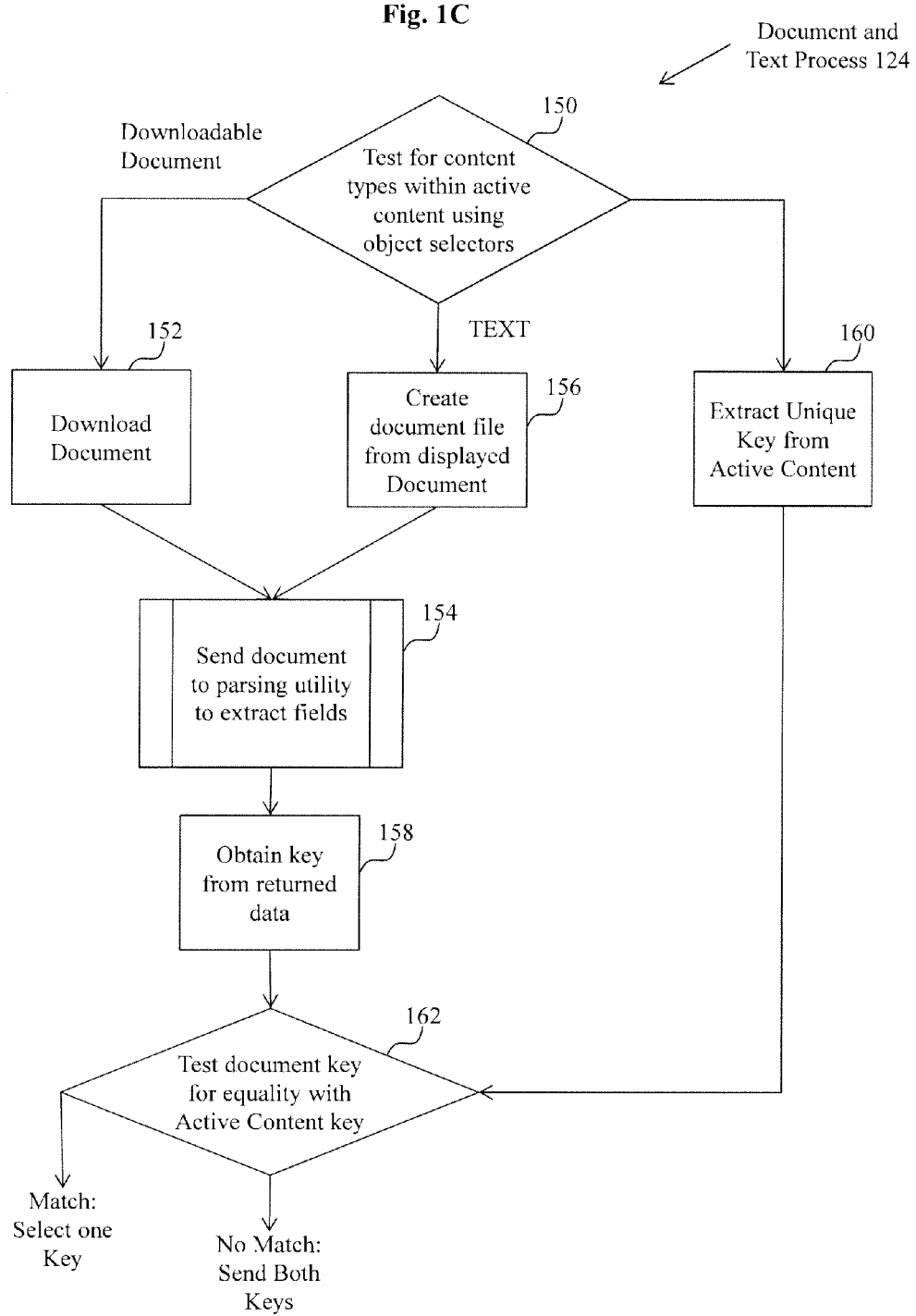

SYSTEM AND METHOD FOR CONTEXTUAL WORKFLOW AUTOMATION

SUMMARY OF THE INVENTION

Embodiments comprise a non-transitory computer-readable medium, comprising computer program code for execution by one or more computers, where a user computer comprises one of the one or more computers, comprising instructions to perform the method: receiving active content, where the active content comprises computer code for configuring a display with user-requested content in a first display interface on a display screen of the user computer; automatically matching or having matched without user intervention, selected data from the active content to target category data, wherein the target category data comprises predefined categories of information of interest to a user; when there is a match for items of the selected data, then extracting or having extracted, data from the active content that matches object selector data, including a unique key; searching or sending a request to search a customer database of database records using at least the unique key to obtain database records; when there are no database records found or returned from the search operation, then automatically creating or having created without user intervention a new record comprising a first plurality of fields based at least in part on the selected data extracted from the active content for provision to the customer database; when there is one database record found or returned from the search operation, then automatically updating or having updated without user intervention when one or more conditions is met, one or more items within the one database record based at least in part on the selected data extracted from the active content, and selecting a second plurality of fields from the one database record; when there are two or more database records found or returned from the search operation, then automatically determining or having determined a primary database record, based on one or more criteria, and automatically updating or having updated without user intervention when one or more conditions is met, one or more items within the primary database record based at least in part on the selected data extracted from the active content, and selecting a third plurality of fields from the primary database record; creating or requesting creation, of display data based at least in part on the first plurality of fields of the new record, or the second plurality of fields for the one record, or the third plurality of field for the primary record; and displaying, by the user computer, in a second display interface on the display screen the display data created.

In embodiments, the computer-readable code for the record updating steps may comprise obtaining update date for the one record or the primary record returned; and comparing or requesting comparison, of the update date for the respective record to a date associated with the active data, and only triggering the updating or having updated operation when date associated with the active data is after the update date for the respective record.

In embodiments, the display data may be created each time active content for user-requested content is received.

In embodiments, the display data may be stored in persistent storage.

In embodiments, the computer-readable code for creating display data may comprise computer code for including data for one or more other of the database records from the search that are not the primary database record in the display data, when there are two or more database records.

In embodiments, the computer-readable code for automatically updating or having updated one or more items in the primary database record may be configured to update selected data in one or more of the other database records from the search.

In embodiments, the data for one or more other of the database records may comprise log data.

In embodiments, the object selector data may comprise one or more selected from the group of contact methods, location data, and metadata for the active content, and metadata for a document.

In embodiments, the computer-readable code for creating display data may be configured to add an ID for the record or a respective link to one or more of the database records.

In embodiments, the second display interface may be adjacent to the first display interface.

In embodiments, the computer-readable medium may further comprise computer-readable code for automatically matching or having matched, source data from the active content to predetermined source data, and the step of performing target category matching may only performed when there is a match of the source data to an item in the predetermined source data.

In embodiments, the active content may be computer readable code received from a communications module, and further comprising computer-readable code for performing the steps: determining or having determined if there is object selector data for a downloadable target document in the active content; when there is a downloadable document, then downloading the target document and parsing or having parsed selected data in the target document; wherein the extracting step may comprise extracting or having extracted a first potential key from the active content; extracting or having extracted a second potential key from parsed content in the target document; and comparing or requesting comparison the first potential key to the second potential key and when they match, then designating one of the first and second potential keys as the unique key, and when they do not match, then performing the search of the customer database using both of the potential keys as the unique key.

In embodiments, the non-transitory computer-readable medium may further comprise computer-readable code for performing the steps: comparing or requesting comparison of text in the active content to a set of predetermined text formats; when there is a match to one of the text formats, then creating or having created a document; parsing or having parsed selected data in the document created using the object selector data; wherein the extracting step may comprise extracting or having extracted a first potential key from the active content; and extracting or having extracted a second potential key from parsed content in the target document; and comparing or having compared the first potential key to the second potential key and if they match, then designating one of the first and second potential keys as the unique key, and if they do not match, then performing the search of the customer database using both of the potential keys as the unique key.

In embodiments, the computer-readable code for the searching step may be configured to search or have searched the customer database using the unique key and one or more selected from the group of active content metadata and location data.

In embodiments, the new record for the customer database may comprise the selected data obtained from the extracting step; and further comprising computer-readable code to send the new document to the customer database.

In embodiments, the computer-readable medium may further comprise computer-readable code for receiving from the customer the object selector data.

Embodiments of a non-transitory computer-readable medium are disclosed, comprising computer program code for execution by one or more computers, where a user computer comprises one of the one or more computers, comprising instructions to perform the method: receiving, by the user computer, active content, where the active content comprises computer code for configuring a display with user-requested content in a first display interface on a display screen of the user computer; automatically matching or having matched source data from the active content to predetermined source data; automatically matching or having matched without user intervention selected data from the active content to target category data, only when there is a match of the source data to an item in the predetermined source data, wherein the target category data comprises predefined categories of information of interest to a user; when there is a match for items of the selected data, then extracting or having extracted, data from the active content that matches object selector data in a downloadable document, including a unique key; searching or sending a request to search a customer database of database records using at least the unique key to obtain database records; when there are no database records found or returned from the search operation, then automatically creating or having created without user intervention a new record comprising a first plurality of fields based at least in part on the selected data extracted from the active content for provision to the customer database; when there is one or more database records found or returned from the search operation, then automatically updating or having updated without user intervention when one or more conditions is met, one or more items within at least one of the database records based at least in part on the data extracted from the active content, and selecting a second plurality of fields from the one database record; creating or having created display data based at least in part on the first plurality of fields of the new record, or the second plurality of fields for the one record; and displaying, by the user computer, in a second display interface on the display screen the display data created.

In embodiments, the computer-readable code for the record updating steps implement one of the conditions with the steps: obtaining update date for the one record or the primary record returned; and comparing or having compared the update date for the respective record to a date associated with the active data, and only triggering the updating or having updated operation when date associated with the active data is after the update date for the respective record.

Embodiments of a computer system, are disclosed comprising one or more computers, where a user computer comprises one of the one or more computers, configured with: a receiving component configured in the one or more computers to receive active content, where the active content comprises computer code for configuring a display with user-requested content in a first display interface on a display screen of the user computer; a matching engine configured in the one or more computers, to automatically match or have matched without user intervention selected data from the active content to target category data, wherein the target category data comprises predefined categories of information of interest to a user; an extraction engine configured in the one or more computers to operate, when there is a match for items of the selected data, to extract data from the active content that matches object selector data, including a unique key; a search request component configured in the one or more computers to search or send a request to search a customer database of database records using at least the unique key to obtain database records; a creation and update component configured in the one or more computers to operate: when there are no database records found or returned from the search operation, then automatically creating or having created without user intervention, a new record comprising a first plurality of fields based at least in part on the selected data extracted from the active content for provision to the customer database; when there is one database record found or returned from the search operation, then automatically updating or having updated without user intervention when one or more conditions is met, one or more items within the one database record based at least in part on the selected data extracted from the active content, and selecting a second plurality of fields from the one database record; when there are two or more database records found or returned from the search operation, then automatically determining a primary database record, based on one or more criteria, and automatically updating or having updated without user intervention when one or more conditions is met, one or more items within the primary database record based at least in part on the selected data extracted from the active content, and selecting a third plurality of fields from the primary database record; a display data generator configured in the one or more computers to create display data based at least in part on the first plurality of fields of the new record, or the second plurality of fields for the one record, or the third plurality of field for the primary record; and wherein the display displays the display data created in a second display interface on the display screen.

In embodiments, the creation and update component is configured to create display data may comprise computer code for including data for one or more other of the database records from the search that are not the primary database record in the display data, when there are two or more database records.

In embodiments, the matching engine may be further configured to automatically match or have matched source data from the active content to predetermined source data, and only performing the matching operation of the active content to the target category data when there is a match of the source data to an item in the predetermined source data.

In embodiments, he active content may computer readable code received from a communications module, and the extraction engine may further comprise: a document detector configured in the one or more computers to determine if there is object selector data for a downloadable target document in the active content; a download engine configured in the one or more computers to download the downloadable target document; a parsing engine configured in the one or more computers to parse or request parsing of selected data in the target document, and wherein the extraction engine may be configured: to extract a first potential key from the active content; to extract a second potential key from parsed content of the target document; and to compare the first potential key to the second potential key and when they match, then sending one of the potential keys as the unique key to the search request component to perform the search of the customer database, and when they do not match, then sending both of the potential keys as the unique key to the search request component to perform the search of the customer database.

In embodiments, the extraction engine may further comprise: a comparator configured in the one or more computers to compare data in the active content to a set of predetermined text formats; a document creator engine configured to create a document when there is a match to one of the text formats; a parsing engine configured in the one or more computers to parse or request parsing of selected data in the document created using the object selector data, and the extraction engine may be configured in the one or more computers: to extract a first potential key from the active content; to extract a second potential key from parsed content of the document created; and to compare the first potential key to the second potential key and when they match, then sending one of the potential keys as the unique key to the search request component to perform the search of the customer database, and when they do not match, then sending both of the potential keys as the unique key to the search request component to perform the search of the customer database.

In embodiments, the creation and update component may be further configured: to obtain update date for the one record or the primary record returned; and to compare or have compared the update date for the respective record to a date associated with the active data, and only triggering the updating or having updated operation when date associated with the active data is after the update date for the respective record.

Embodiments may comprise a method of: receiving active content, where the active content comprises computer code for configuring a display with user-requested content in a first display interface on a display screen of the user computer; automatically matching or having matched without user intervention, by the user computer, selected data from the active content to target category data, wherein the target category data comprises predefined categories of information of interest to a user; when there is a match for items of the selected data, then extracting or having extracted, by the user computer, data from the active content that matches object selector data, including a unique key; searching or sending a request to search, by the user computer, a customer database of database records using at least the unique key to obtain database records; when there are no database records found or returned from the search operation, then automatically creating or having created, by the user computer, without user intervention a new record comprising a first plurality of fields based at least in part on the selected data extracted from the active content for provision to the customer database; when there is one database record found or returned from the search operation, then automatically updating or having updated without user intervention, by the user computer, when one or more conditions is met, one or more items within the one database record based at least in part on the selected data extracted from the active content, and selecting a second plurality of fields from the one database record; when there are two or more database records found or returned from the search operation, then automatically determining or having determined, by the user computer, a primary database record, based on one or more criteria, and automatically updating or having updated without user intervention when one or more conditions is met, one or more items within the primary database record based at least in part on the selected data extracted from the active content, and selecting a third plurality of fields from the primary database record; creating or requesting creation, by the user computer, of display data based at least in part on the first plurality of fields of the new record, or the second plurality of fields for the one record, or the third plurality of field for the primary record; and displaying, by the user computer, in a second display interface on the display screen the display data created.

Embodiments of a method of: receiving, by a user computer, active content, where the active content comprises computer code for configuring a display with user-requested content in a first display interface on a display screen of the user computer; automatically matching or having matched, by the user computer, source data from the active content to predetermined source data; automatically matching or having matched without user intervention, by the user computer, selected data from the active content to target category data, only when there is a match of the source data to an item in the predetermined source data, wherein the target category data comprises predefined categories of information of interest to a user; when there is a match for items of the selected data, then extracting or having extracted, by the user computer, data from the active content that matches object selector data in a downloadable document, including a unique key; searching or sending a request to search, by the user computer, a customer database of database records using at least the unique key to obtain database records; when there are no database records found or returned from the search operation, then automatically creating or having created without user intervention, by the user computer, a new record comprising a first plurality of fields based at least in part on the selected data extracted from the active content for provision to the customer database; when there is one or more database records found or returned from the search operation, then automatically updating or having updated without user intervention, by the user computer, when one or more conditions is met, one or more items within at least one of the database records based at least in part on the data extracted from the active content, and selecting a second plurality of fields from the one database record; creating or having created, by the user computer, display data based at least in part on the first plurality of fields of the new record, or the second plurality of fields for the one record; and displaying, by the user computer, in a second display interface on the display screen the display data created.

BRIEF DESCRIPTION OF THE DRAWINGS

The above and related objects, features and advantages of the present invention, will be more fully understood by reference to the following detailed description of the exemplary embodiments of the present invention, when taken in conjunction with the following exemplary figures, wherein:

FIG. 1A is a logic flowchart for embodiments of the present invention.

FIG. 1B is a continuation of the flowchart of FIG. 1A.

FIG. 1C is a continuation of the flowchart of FIG. 1A directed to text processing.

DETAILED DESCRIPTION OF THE EMBODIMENTS

Figure 2:
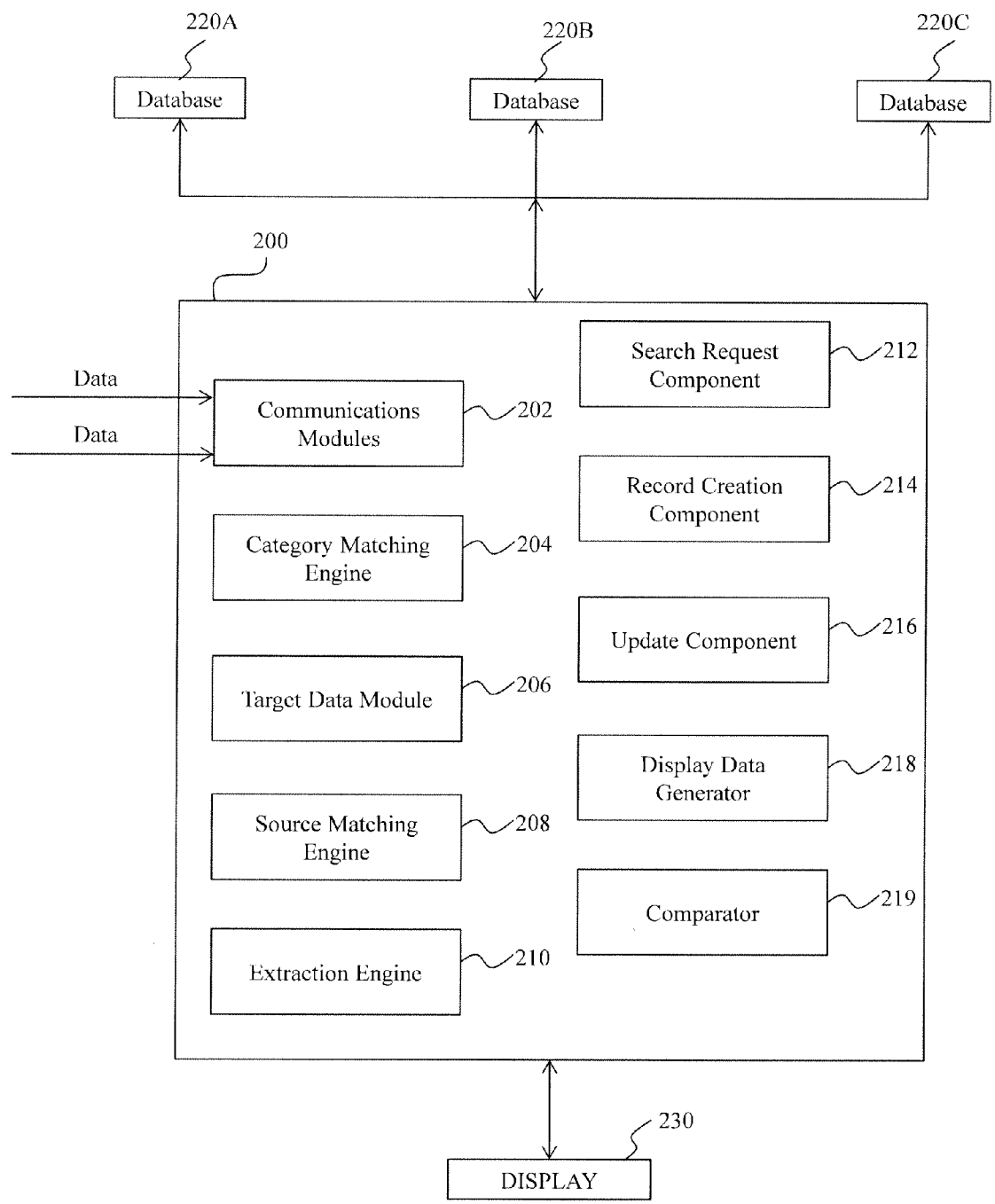
FIG. 2 is a schematic block diagram of embodiments consistent with the invention.

Object—a subset of computer readable code which may contain a specific text field (e.g. text, document data, phone number), or computer readable data that is a necessary component of the extraction process (e.g. document key).

Object Selector—means an instruction that specifies the possible location(s) of an object for use by the extraction engine.

Object Selector Data—means a multitude of object selectors loaded at runtime of the extraction engine that are applicable to the active content.

Object Selector Database—means a multitude of object selector data sets categorized by content provider.

In embodiments, a middleware application is provided that integrates with user applications to monitor content accessed, and automatically store contextually relevant information to a customer's database system and update records in the customer database(s).

In embodiments, the application may be used, for example, by sales organizations to store information accessed by representatives during a network communications session, to automatically create or update a customer record without any intervention by the user beyond opening the network session to view information. In embodiments, this updated record, or a summary of data therein, may then be displayed to augment the accessed content, showing details of previous updates and activity, contact information captured from other sources, etc. Note that "updating" an item in a record means putting in more recent information.

In embodiments, a process consistent with the invention may comprise:
1. Configure information storage system settings, access credentials, types of content a user wishes to capture (e.g. Resumes, Leads, etc).
2. When the user accesses content that is recognized as a relevant context, processing is triggered.
3. Relevant details are extracted from the content, linked files, profiles, etc. These details are manipulated to form a record that the customer's storage system expects.
4. The storage system is checked for existing records that match. If one is found, the details are compared and updated as needed. If no record exists, the data will be sent as a new record.
5. This merged data or a summary thereof from internal records may then be displayed for the user to review, in an interface alongside of or accessible from the original content that is being displayed.

Referring now to FIG. 1, embodiments of a logic flowchart are disclosed that are consistent with the invention for automatically, e.g., without customer intervention, accessing and updating one or more customer databases 100 during a user computer session and presenting a second display interface providing summary data for one or more of the updated customer records. The operation may be performed by a user computer loaded with the appropriate software, or the user computer can request that certain of the operations be performed by one or more local computers and/or distributed computers. Thus, multiple of the operations may be performed via servers from the cloud.

In embodiments, initially, specific configuration settings may be obtained from the customer/user and loaded into a settings database 102 for the software and/or variables of the system. Some examples comprise:
The customer's specific login details (username/password) for their external database;
Enabling or disabling of specific features by the user's choice;
Enabling or disabling of specific features by us from the level of service they have signed up for;
Disabling specific websites, etc.

Additionally, a Categorized Provider database 104 may be loaded that comprises selected network areas of interest to the user, for example selected Websites of interest. Additionally a Content Object Selector database 106 may be loaded that may comprise, for example, specific content, field types, file types (e.g., DOC, PDF), objects (e.g., a document), metadata (for example, HTML or XML code or Javascript) identifying the target categories of interest, and predefined categories of information of interest to a user, e.g., resumes, contact data, to name a few. In embodiments, this data may be pushed or pulled directly from the customer databases.

In embodiments, a network communication session is initiated as represented by block 110, e.g., an email session, an Internet search session, to name a few, where display data is provided for display on the user device, and active content is received, as represented by block 112.

Diamond block 116 comprises a computer operation of obtaining target category data, and automatically matching or having matched by an external computer without user intervention, using a matching engine, data from active content obtained from the display data received in the session to target category data. The active content comprises computer code for configuring a display with user-requested content in a first display interface on a display screen of a user computer, e.g., HTML, XML. [Note that diamond logic block 114 represents an optional computer operation, and will be discussed below.] In embodiments, this operation may comprise accessing target category data from the content object selector database 106, containing items such as specific content, field types, objects (e.g., a document), metadata (for example, HTML or XML code or Javascript) identifying the target categories of interest, and predefined categories of information of interest to a user, e.g., resumes, contact data, to name a few. This database access operation is represented by block 118. In embodiments, relevant data may be matched. In embodiment, only a sub-set of the relevant data may be matched. In embodiments, some or all of the target category data may be received or have been obtained from a customer/user.

In embodiments, the diamond block 116 may optionally be automatically triggered only when the source of the active content is from a predetermined approved source, e.g., a selected set of websites, or a selected set of databases, to name a few. In such embodiments, a preliminary operation 114 may be performed of automatically comparing or having compared by an external computer, source data from the active content obtained from the session of block 112 to predetermined source data, and only triggering the category matching operation 116 to perform target category matching when there is a match between source data in the active content and an item in the predetermined source data. In embodiments, this operation may comprise accessing the categorized provider database 104 to obtain the predetermined source data for use in the comparison/matching. This database access is represented by block 120. In embodiments, when there is not a match to a source in the categorized provider database 104, then the process may end.

Block 122 represents the computer operation of extracting via an extraction engine configured in the user computer or having extracted via communication with a server computer, all relevant data from the active content that matches object selector data, and determining a unique key. The type of unique key is not limiting on the invention. For example, the unique key may be an email address, a telephone number, a name, other identification number, to name a few. In embodiments, the unique key determination operation may comprise selecting the unique key according to a hierarchy, e.g., email address if present, if not then telephone number if present, if not then some other identification number and/or text. In some embodiments, all relevant data may be extracted only if a predetermined key type is found. In other embodiments, when a predetermined unique key type is not found, then a process may be initiated to create a unique key based on one or more criteria, such as a combination of one or more textual references and/or metadata elements (e.g., a document reference identifier, a user account code, etc.). When a document is downloadable or there is text in the active data, then an additional process 124 may be triggered. This processing is described in FIG. 1C.

Block 126 represents a computer operation of searching, by the user computer, or sending a request to search to an external computer, the external customer database 100 of database records using at least the unique key to obtain database records. In embodiments, multiple unique keys of different types, e.g., email address and telephone number, may be used for the search request. In embodiments, multiple unique keys of the same types, e.g., two email addresses, may be used for the search request.

Block 128 represents a computer operation of counting, using a calculator in the user computer or a server computer, the number of database records returned from the search.

Block 130 represents a computer operation that is triggered when there are no database records found or returned from the search operation. This process automatically initiates creation, by the user computer, or requesting creation to an external computer without user intervention, of a new record for provision to the customer database. In embodiments, the new record may comprise a first plurality of fields based at least in part on the selected data extracted from the active content. The creation operation is represented by block 132. For example, the new record may comprise data from the fields such as contact information (e.g. phone, email, etc), location (e.g. zip code), source (e.g. monster.com), activity date (e.g. updated 5/23/2014). In embodiments, this operation further may comprise a sending operation to send the new document to the customer database 100. In embodiments, this operation may comprise a sending operation to send the extracted data to the customer database 100 to allow the customer database to create the new document.

Figure 4:
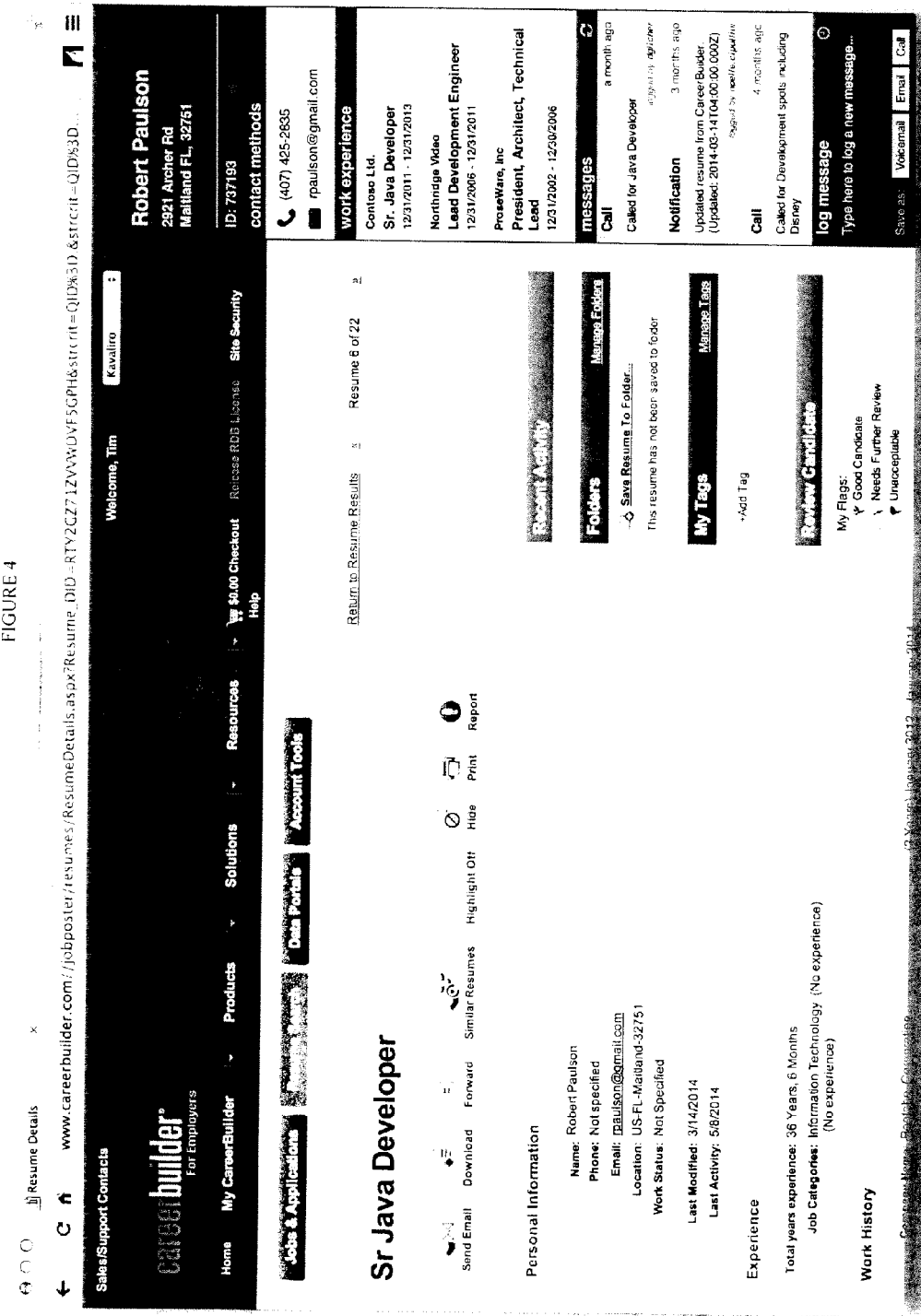
FIG. 4 is a schematic is an example display screen illustrating embodiments of a first interface and a second interface.

Block 134 represents a computer operation, that is triggered when there is one database record found or returned from the search operation, of automatically updating, by the user computer, or having updated by the server computer, without user intervention, when one or more conditions are met, one or more items within the one database record based at least in part on the selected data extracted from the active content. Blocks 138, 140, 142, and 144, to be discussed below, provide an example implementation of this condition. In embodiments, one such condition may comprise only performing the update operation when this active content was created or updated after the last update date for the one record returned. In embodiments, example data that may be updated may be a telephone number, an email address, a location, to name a few. In embodiments, a second plurality of fields may be selected from the one database record that was updated, to be used as summary data for a second display interface. For example, if the email is a resume or contains resume text, then the second plurality of fields may comprise one or more selected from the group of the name of the person, the person's address, contact methods for the person, e.g., telephone number and/or email address, companies worked for and positions held, to name a few. As an example, see the sidebar of FIG. 4.

Blocks 136 and 137 represent a computer operation that is triggered when there are two or more database records found or returned from the search operation, to automatically determine by the user computer, or have determined via an external computer, a primary database record, based on one or more first criteria. In embodiments, this determination of a primary record may comprise quantifying activity that is attached to the record. By identifying the best or primary record, the system then knows which record to update and to log new messages to.

In embodiments, this quantifying operation may comprise scoring the time since the action and the action type in the log data. For example:

| ID | Time ago | TIMEW | Message Action | MSGW | Subtotal Weight |
|---|---|---|---|---|---|
| 123 | 2 | 0.7071 | Email | 1 | 0.7071 |
| 123 | 50 | 0.1414 | Order Candidate | 5 | 0.7071 |
| 123 | 25 | 0.2000 | Call | 2 | 0.4000 |
| 123 | 55 | 0.1348 | Notification | 0.5 | 0.0674 |
| 555 | 75 | 0.1155 | Notification | 0.5 | 0.0577 |
| 555 | 80 | 0.1118 | Email | 1 | 0.1118 |
| 12 | 300 | 0.0577 | Call | 2 | 0.1155 |

Combining the subtotal weights, the profile IDs final rank is:
1. ID 123—Score 1.882 (Primary record)
2. ID 555—Score 0.170
3. ID 12—Score 0.115

In embodiments, when the primary record is determined, then automatically updating by the user computer or having updated by the server computer, without user intervention, when one or more conditions are met, one or more items within the primary database record based at least in part on the selected data extracted from the active content. In embodiments, one such condition may comprise only performing the update operation when this active content was created or updated after the last update date for the primary record returned. As noted, blocks 138, 140, 142, and 144, to be discussed below, provide an example implementation of this condition. In embodiments, a third plurality of fields may be selected from the primary database record that was updated, to be used as summary data for the second interface. In embodiments, the first and second and third data fields may be the same. In embodiments, the first and second and third data fields may be different. Examples of this data are shown in the sidebar interface of FIG. 4.

In some embodiments, similar items may be updated in other non-primary records as described.

In embodiments where two or more database records are returned, data may also be selected for display from the one or more or all of the other of the database records returned from the search that are not the primary database record. For example, the data for one or more other of the database records may comprise log data, as shown in the sidebar interface 420 of FIG. 4 under the Messages heading. In the example, a logged voicemail is listed with the summary "Sent to BSP for Sr. Java Developer position, 2 hours ago by rebecca white." Another example message is a log from a call "Spoke with former supervisor at DaVita-sharp candidate." Note that the sidebar interface may comprise, in embodiments, a text space for adding new message data for a particular record. In embodiments, there may be buttons or other indicators to allow the saving of Voicemail, Email, and Call log data. See for example, the sidebar of FIG. 4.

Embodiments of computer logic that may be used to implement the determination whether to update based on the one or more criteria is shown in blocks 138, 140, 142, and 144.

Block 138 represents a computer operation of querying the customer database, by the user computer or the server computer, to determine a last update date for the primary record returned in the search. In embodiments, a computer operation may be initiated querying the customer database to determine a last update date for multiple or all of records returned in the search.

Diamond block 138 and 140 represent a computer operation, by the user computer or the server computer, of determining if there is an update date for the one record or the primary record returned in the search. If NO, then the returned one record or the primary record may be updated in block 144 as discussed. If YES, then performing a comparing operation in the logic block 142 to determine if the update activity date for the one record or the primary record occurred prior to the active content date. If YES, then the respective record may be updated. If NO, indicating that this record in the database contains data that is more current or the same age as the active data, then ending the process without an update. Note that in embodiments multiple of the returned records may be updated using this same or a similar process to apply the update criterion discussed above.

Example 1

Active content is dated 5/23/2014 vs Database content dated 1/2/2014
5/23/2014>1/2/2014
NEWER THAN DATABASE DATA, PROCEED WITH UPDATE Example 2

Active content is dated 1/2/2014 vs Database content is dated 5/23/2014
1/2/2014<5/23/2014
OLDER THAN DATABASE DATA, DO NOTHING Example 3

Active content is dated 5/23/2014 vs Database content dated 5/23/2014
5/23/2014==5/23/2014
DATA WAS MODIFIED ON THE SAME DAY/IS THE SAME AGE, DO NOTHING As noted, computer logic for block 124 in FIG. 1A is directed to extracting information from the active data, and may be performed by the user computer or the server computer. Embodiments of block 124 are shown in FIG. 1C. Referring to FIG. 1C, the diamond block 150 represents a test operation to determine if there is an indicated target document download or a document embedded in the active content matching predefined object selector data. In embodiments, this operation may be performed by comparing the active content to a plurality of different content types, such as file or MIME type (e.g. .docx application/vnd.openxml-formats-officedocument.wordprocessingml.document), document storage identifier (e.g. Resume ID qjy2nur5-wntg5mxq), or link structure (e.g. http://example.com/resume/download/johndoe).

Block 152 represents a computer operation of downloading the document, when there is a downloadable target document detected by the object selector data, e.g., a content type in the active content indicating a downloadable document. For example, the downloadable content may be a resume. The logic then proceeds to block 154.

Block 154 represents a computer operation of parsing or having parsed selected data in the target document. In embodiments, this parsing operation may comprise sending, via a communications network, the downloaded target document to an external parsing service computer. In embodiments, this parsing operation may be performed by the user computer. In embodiments, the parsing operation may obtain fields such as First Name, Phone number, Address.

Block 156 represents a computer operation, when there is no match for a downloadable target document to object selector data, but there is embedded data for a document within the active content, then this embedded data may be manipulated to create a document file from the displayed text. In embodiments, the document file creation step may be preceded by a computer operation of comparing, by the user computer, the text in the active content to a set of predetermined text formats. In embodiments, the text formats may comprise one or more resume formats, document ID, or one or more other embedded data formats, to name a few. When there is determined to be a match to one of the text formats, then creating the document, by the user computer. In embodiments, this creation of a document file comprises analyzing the structure and formatting of the document, and making changes as necessary to optimize it for saving and display by for example removing invalid characters or symbols and converting computer readable code of the document display to a compatible file format. In embodiments, the text formats used in the comparing operation of the text in the active content to a set of predetermined text formats may comprise in embodiments, file or MIME type (e.g. .docx application/vnd.openxmlformats-officedocument.wordprocessingml.document), document storage identifier (e.g. Resume ID qjy2nur5wntg5mxq), or link structure (e.g. http://example.com/resume/download/johndoe.) The logic then proceeds to block 154 to parse or have parsed the text in the created document file.

Block 158 represents a computer operation, of extracting via the extraction engine a first potential key from the parsed document or the parsed text in the created document file. This operation has been previously described. As noted, the type of unique key is not limiting on the invention. For example, the unique key may be an email address, a telephone number, a name, other identification number, to name a few.

Block 160 represents a computer operation, of extracting via the extraction engine a second potential key from the active content in the first display interface.

Block 162 represents a computer operation, of comparing the first potential key to the second potential key and when they match, then designating one of the first and second potential keys as the unique key for the search, and when they do not match, then performing the search of the customer database using both of the potential keys as the unique key.

Referring to FIG. 2, a computer 200 comprising multiple computing and transfer modules or components therein for implementing embodiments of the invention to access and update one or more customer databases 220 during a user computer session and to present a display interface providing summary data for one or more of the customer records. In embodiments, some of the modules or engines may be configured in the user computer, and some of the modules and engines may be configured in one or more external computers.

In embodiments, the computers 200 for the system may comprise a communications component 202 connected to one or more communications networks to communicate with the one or more customer databases 220, and to communicate via one or more computer communication sessions, e.g., email sessions, Internet search sessions, to name a few. In embodiments, the communications component 202 may be configured in the computer to receive active content, where the active content comprises computer code for configuring a display with user-requested content in a first display interface on a display screen of the user computer.

In embodiments, the one or more computers for the system may comprise a matching engine 204 configured in the one or more computers to automatically match, without user intervention, selected data from the active content to target category data obtained from a target data module 206, wherein the target category data comprises predefined categories of information of interest to a user, e.g., resumes, contact data, to name a few. In embodiments, some or all of the target category data may be received or obtained from the customer.

In embodiments, the matching engine 204 may be automatically triggered only when the source of the active content is from a predetermined approved source, e.g., a selected set of websites, or a selected set of databases, to name a few. Accordingly, in embodiments a source matching engine 208 may be configured with computer-readable code for automatically matching source data from the active content to predetermined source data, and only triggering the category matching engine to perform target category matching when there is a match of the source data to an item in the predetermined source data.

In embodiments, an extraction engine 210 may be configured in the one or more computers, to be triggered when there is a match for items of the selected data, to extract data from the active content that matches object selector data, including a unique key. The type of unique key is not limiting on the invention. For example, the unique key may be an email address, a telephone number, a name, other identification number, to name a few.

In embodiments for processing downloadable target documents, the extraction engine 210 may be configured in the user computer with a document detector to determine if there is object selector data for a downloadable target document in the active content; a download engine configured in the user computer to download the downloadable target document; a parsing engine configured in the user computer to parse or to request parsing of the selected data in the target document. The extraction engine 210 may further be configured to extract a first potential key from the active content; to extract a second potential key from parsed content of the target document; and to compare the first potential key to the second potential key and when they match, then sending one of the potential keys as the unique key to the search request component to perform the search of the customer database, and when they do not match, then sending both of the potential keys as the unique key to the search request component to perform the search of the customer database.

In embodiments for processing text found in the display, the extraction engine 210 may be configured in the user computer with a comparator to compare text in the active content to a set of predetermined text formats; a document creator engine configured to create a document when there is a match to one of the text formats; a parsing engine configured to parse or request parsing of the selected data in the document created [using the object selector data]. The extraction engine 210 may further be configured: to extract a first potential key from the active content; to extract a second potential key from parsed content of the document created; and to compare the first potential key to the second potential key and when they match, then sending one of the potential keys as the unique key to the search request component to perform the search of the customer database, and when they do not match, then sending both of the potential keys as the unique key to the search request component to perform the search of the customer database.

In embodiments, a search request component 212 may be configured in the one or more computers to search or send a request to search the one or more customer databases 220 of database records using at least the unique key to obtain database records.

In embodiments, a record creation component 214 may be configured in the one or more computers to operate when there are no database records found or returned from the search operation, to automatically create or request creation of a new record with a first plurality of fields based at least in part on the selected data extracted from the active content for provision to the customer database.

In embodiments, an update component 216 may be configured in the one or more computers to operate when there is one or more database records found or returned from the search operation. In embodiments, when there is only one database record returned, then the update component 216 may be configured to automatically update or have updated when one or more second conditions are met, e.g., when the data in the active content is more current than the record, one or more items within the one database record based at least in part on the selected data extracted from the active content, and may select a second plurality of fields from the one database record to be used for a subsidiary interface. For example, the items updated may comprise contact information for a person such as a telephone number and/or email address, and/or location data, or any other data that may be designated by the user. The second plurality of fields, in embodiments, may comprise message log data, record status (e.g. disabled or inactive), email address, telephone number, additional contact methods, etc.

In embodiments, the update component 216 may be configured to automatically determine, when there are two or more database records found or returned from the search operation, a primary database record, based on one or more first criteria, and to automatically update or have updated one or more items within the primary database record when the one or more conditions are met, e.g., the data in the active content is more current than the record, based at least in part on the selected data extracted from the active content, and selecting a third plurality of fields from the primary database record for the subsidiary interface. In embodiments, the third plurality of fields may be the same as the second plurality of fields. In embodiments, the third plurality of fields may be different from the second plurality of fields.

In embodiments, a display data generator 218 may be configured in the one or more computers to create display data comprising the first plurality of fields of the new record, or the second plurality of fields for the one record, or the third plurality of field for the primary record, for display. In embodiments, the display data generator 218 may format the data for display in a second or subsidiary interface on a display screen 230. In embodiments, this second or subsidiary interface may be adjacent to the first interface displaying the first interface. In embodiments, the second or subsidiary interface may not be adjacent to the first interface. In embodiments, the data may be configured to be inserted into the first interface. In embodiments, the data may be accessible from the first interface.

In embodiments, a comparator 219 may be configured in the one or more computers to compare the update date for the respective record to a date associated with the active data, and to only trigger the updating or having updated operation when the date associated with the active data is after the update date for the respective record.

Figure 3:
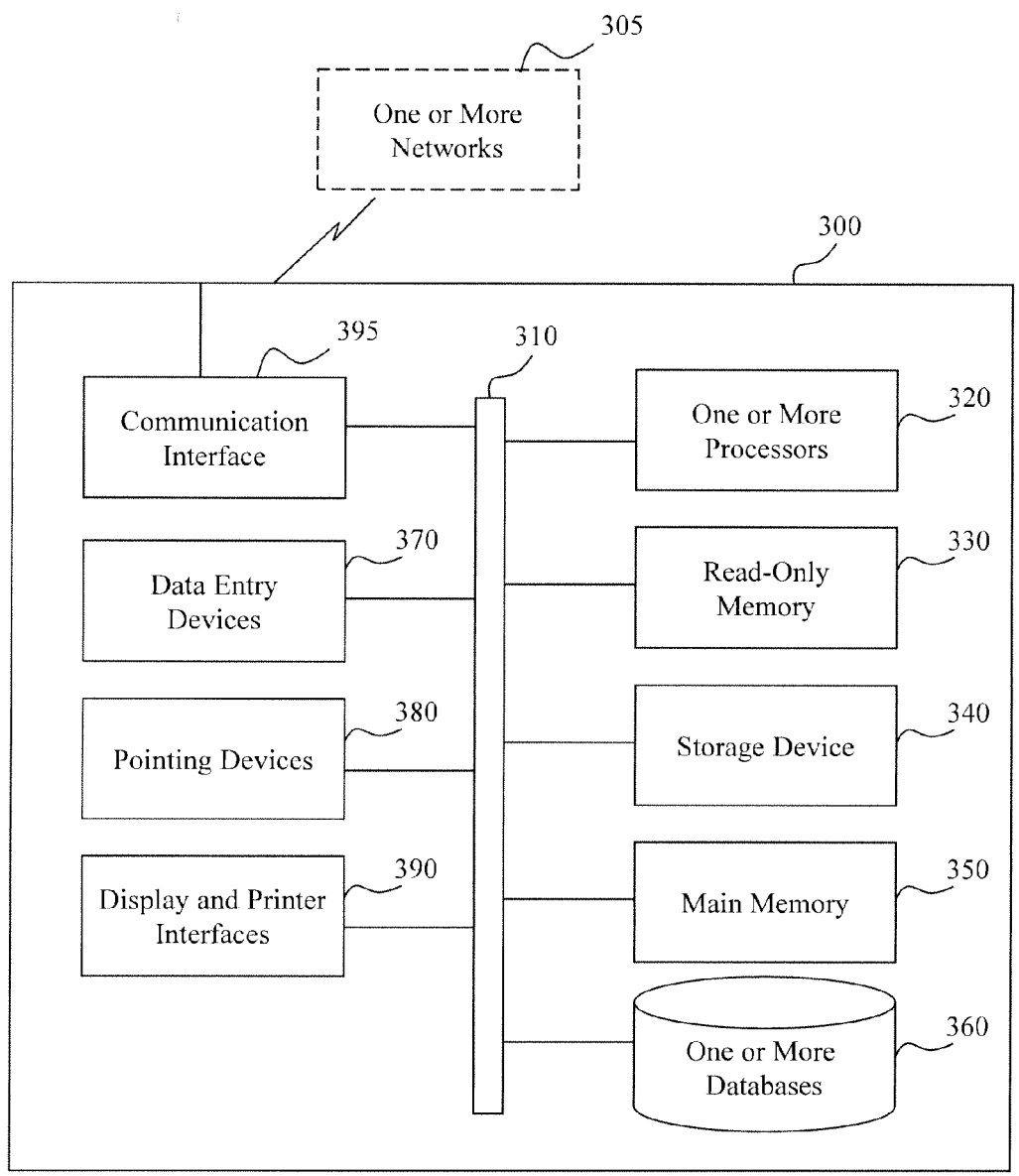
FIG. 3 is a schematic block diagram of a computer system that may be used to implement the present invention.

FIG. 3 is a block diagram illustrating embodiments of the system of FIG. 2, generally designated by reference number 300 in FIG. 3. In embodiments, the system 300 according to the present invention may be communicatively coupled to one or more networks 305 via a communication interface 395. The one or more networks 305 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the communication interface 395 may be implemented accordingly. The network 305 serves the purpose of delivering information between connected parties.

The system 300 may comprise, in some embodiments, a computing platform for performing, controlling, and/or initiating computer-implemented operations, for example, via a server and the one or more networks 305. The computer platform may comprise system computers and other party computers. An exemplary system 300 may operate under the control of computer-executable instructions to carry out the process steps described herein. Computer-executable instructions comprise, for example, instructions and data which cause a general or special purpose computer system or processing device to perform a certain function or group of functions. Computer software for the system 300 may comprise, in embodiments, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The system 300 may include one or more personal computers, workstations, notebook computers, servers, mobile computing devices, handheld devices such as mobile telephones and PDA's, multi-processor systems, networked personal computers, minicomputers, mainframe computers, personal data assistants, Internet appliances (e.g., a computer with minimal memory, disk storage and processing power designed to connect to a network, especially the Internet, etc.), or controllers, to name a few.

The system 300 may comprise, in embodiments, a bus 310 or other communication component that couples the various system elements 320-395, and is configured to communicate information between the various system elements 320-395.

As shown in FIG. 3, one or more computer processors 320 may be coupled with the bus 310 and may be configured to process and handle information and execute instructions. The system 300 may include a main memory 350, such as a Random Access Memory (RAM) or other dynamic storage device, coupled to the bus 300, for storing information and instructions to be executed by the one or more processors 320. The main memory 350 also may be used for storing temporary variables or other intermediate information during execution of instructions by the one or more processors 320.

The system 300 further may include a Read-Only Memory (ROM) 330 or other static storage device (e.g., EPROM, EAROM, EEPROM, PROM, flash, and the like) coupled to the bus 310 for storing static information and instructions for the one or more processors 320. Furthermore, a storage device 340, such as a magnetic disk or optical disk, such as a CD-ROM or other optical media may be provided and coupled to the bus 310 for storing information and instructions.

In addition to the ROM 330, one or more databases 360 may be coupled to the bus 310 for storing static information and software instructions. Information stored in or maintained in the database 360 may be provided in conformance with a database system format such as, but not limited to, the Structured Query Language (SQL) format. Database query and access instructions, for example, in the form of one or more scripts, may be used which, when executed by a processor such as the processor 320, serve to access, store and retrieve data maintained in the database 360 according to the instructions contained in the script.

Furthermore, the system 300 may comprise application software instructions which may implement a user interface portion for generating interactive pages or display screens by which a user/participant may provide data to and receive information from the system 300 and the database 360 using a human-machine interface. In embodiments, interactive pages may include user dialog boxes for accepting user entered information. In particular, the human-machine interface may comprise a Graphical User Interface (GUI) portion for prompting the user to enter data by providing an interactive dialog box or message box instructing the user to enter particular data, or to select from among a multitude of options provided using a pull-down menu. In embodiments, a user may interact with the system 300 via the graphical user interface by using a pointing device and/or data entry device. The GUI portion may place the output of the system 300 in a format for presentation to a user via the display. In embodiments, the GUI may be implemented as a sequence of Java instructions.

A data entry device 370, including alphanumeric and other keys, or a pointing device such as a mouse or trackball, or a scanner, to name a few, may be coupled to the bus 310 for communicating information and command selections to the processor 320. The data entry device 370 may be coupled to the bus 310 via an interface (not shown), wherein the interface may be, for example, a serial port, an RS-232 port, or the like. In addition, the interface may be a wireless interface and provide connection-less communication via, for example, Bluetooth communication.

The system 300 may be coupled via the bus 310 to a display or printer 390 for outputting information to a computer user. In addition, a user may use the display (e.g., touch screen) or a scanner to provide information to the system 300.

In embodiments of the present invention, the various program operations as described herein may be provided by the system 300 in response to the one or more processors 320 executing one or more sequences of computer-readable instructions contained in the main memory 350. Such instructions may be read into the main memory 350 from another computer-readable medium, such as the ROM 330, the storage device 340, or the database 360. Execution of the sequences of instructions contained in the main memory 350 may cause the one or more processors 320 to perform the process steps described herein. It should be appreciated that embodiments of the system 300 may perform fewer or additional processes as compared to those described herein. As noted, the one or more processors 320 may be arranged in a multi-processing arrangement. In embodiments, hardwired circuitry may be used in place of or in combination with software instructions to implement the invention. Thus, embodiments of the invention are not limited to any specific combination of hardware circuitry and software.

The term "computer-readable medium" or "computer-readable storage medium," as used herein refers to any medium that is computer-readable and participates in storing and providing instructions to the processor 320 for execution. Such a medium may be removable or non-removable and may take many forms, including, but not limited to, non-volatile media and volatile media. Non-volatile media include, for example, optical or magnetic disks, such as the storage device 340. Volatile media include dynamic memory, such as the main memory 350. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, or any other tangible medium from which a computer can read computer instructions. Combinations of the above are also included within the scope of machine-readable media. Machine-executable instructions comprise, for example, instructions and data which cause a general purpose computer, special purpose computer, or a special purpose processing machine to perform a certain function or group of functions. It should be appreciated that the one or more databases 360, the main memory 350, the storage device 340, and the ROM 330 may, in some embodiments, be described as a "computer-readable medium" or a "computer-readable storage medium."

As previously noted, the system 300 also comprises a communication interface 395 coupled to the bus 310 for providing one-way, two-way or multi-way data communication with the network 305, and/or communication directly with other devices. In embodiments, the communication interface 395 may comprise a modem, a transceiver Integrated Services Digital Network (ISDN) card, a WAN card, an Ethernet interface, or the like, to provide a data communication connection to a corresponding type of communication medium. As another example, the communication interface 395 may comprise a LAN card to provide a data communication connection to a compatible LAN. Wireless links may also be implemented. In such wireless links, the communication interface 395 may communicate with a base station communicatively coupled to a network server. In any such implementation, the communication interface 395 sends and receives electrical, electromagnetic, radio, infrared, laser, or optical signals that carry digital data streams representing various types of information. Any combination of the above interfaces may also be implemented.

In embodiments, the communication interface 395 may be communicatively coupled to a web server configured in the one or more processors 320 to generate and output web content that is suitable for display using a web browser at a computing device. In embodiments, the server may generate and transmit requested information through the communication interface 395 to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from clients' terminals, access and process data from various sources, and output computer-executable instructions and data using the network 305. Interactive pages transmitted and received using the network 305 may conform to necessary protocols.

The web server configured in the one or more processors 320, in embodiments, may correspond to a secure web application server behind a web server program that a service provider employs to run one or more web based application programs (e.g., an application program to carry out the methods described above) in a secure fashion. Such a secure web application server may be configured to execute one or more web based application programs, responsive to commands and data received from the clients (via a web page supported by the web server), and providing data and results to the clients. The web server and the web application server may be implemented using a single computing platform. Alternatively, it may also be implemented using multiple separate and distributed computing platforms.

As noted above, embodiments of the present invention may be practiced in a networked environment using logical connections to one or more remote computers having processors. Logical connections may include a local area network (LAN) and a wide area network (WAN) that are presented here by way of example and not limitation. Such networked environments are in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the flow charts provided herein and the claims show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention may be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations.

All components, modes of communication, and/or processes described heretofore are interchangeable and combinable with similar components, modes of communication, and/or processes disclosed elsewhere in the specification, unless an express indication is made to the contrary. It is intended that any structure or step of an embodiment disclosed herein may be combined with other structure and or method embodiments to form further embodiments with this added element or step While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

I claim:

1. A non-transitory computer-readable medium, comprising computer program code for execution by one or more computers, where a user computer comprises one of the one or more computers, comprising instructions to perform the method:

receiving active content, where the active content comprises computer code for configuring a display with user-requested content in a first display interface on a display screen of the user computer;

automatically matching or having matched without user intervention, selected data from the active content to target category data, wherein the target category data comprises predefined categories of information of interest to a user;

when there is a match for items of the selected data, then extracting or having extracted, data from the active content that matches object selector data, including a unique key;

searching or sending a request to search a customer database of database records using at least the unique key to obtain database records;

when there are no database records found or returned from the search operation, then automatically creating or having created without user intervention a new record comprising a first plurality of fields based at least in part on the selected data extracted from the active content for provision to the customer database;

when there is one database record found or returned from the search operation, then automatically updating or having updated without user intervention when one or more conditions is met, one or more items within the one database record based at least in part on the selected data extracted from the active content, and selecting a second plurality of fields from the one database record;

when there are two or more database records found or returned from the search operation, then automatically determining or having determined a primary database record, based on one or more criteria, and automatically updating or having updated without user intervention when one or more conditions is met, one or more items within the primary database record based at least in part on the selected data extracted from the active content, and selecting a third plurality of fields from the primary database record;

creating or requesting creation, of display data based at least in part on the first plurality of fields of the new record, or the second plurality of fields for the one record, or the third plurality of field for the primary record; and displaying, by the user computer, in a second display interface on the display screen the display data created.

2. The non-transitory computer-readable medium as defined in claim 1, wherein the computer-readable code for the record updating steps implement one of the conditions with the steps:

obtaining update date for the one record or the primary record returned; and comparing or requesting comparison of the update date for the respective record to a date associated with the active data, and only triggering the updating or having updated operation when date associated with the active data is after the update date for the respective record.

3. The non-transitory computer-readable medium as defined in claim 1, wherein the display data is created each time active content for user-requested content is received.

4. The non-transitory computer-readable medium as defined in claim 1, wherein the display data is stored in persistent storage.

5. The non-transitory computer-readable medium as defined in claim 1, wherein the computer-readable code for creating display data comprises computer code for including data for one or more other of the database records from the search that are not the primary database record in the display data, when there are two or more database records.

6. The non-transitory computer-readable medium as defined in claim 1, wherein the computer-readable code for automatically updating or having updated one or more items in the primary database record is configured to update selected data in one or more of the other database records from the search.

7. The non-transitory computer-readable medium as defined in claim 6, wherein the data for one or more other of the database records comprises log data.

8. The non-transitory computer-readable medium as defined in claim 1, wherein the object selector data comprises one or more selected from the group of contact methods, location data, and metadata for the active content, and metadata for a document.

9. The non-transitory computer-readable medium as defined in claim 1, wherein the computer-readable code for creating display data is configured to add an ID for the record or a respective link to one or more of the database records.

10. The non-transitory computer-readable medium as defined in claim 1, wherein the second display interface is adjacent to the first display interface.

11. The non-transitory computer-readable medium as defined in claim 1, further comprising:

computer-readable code for automatically matching or requesting a matching of source data from the active content to predetermined source data, wherein the step of performing or having performed target category matching is only performed when there is a match of the source data to an item in the predetermined source data.

12. The non-transitory computer-readable medium as defined in claim 1,
wherein the active content is computer readable code received from a communications module, and further comprising computer-readable code for performing the steps:
determining or having determined if there is object selector data for a downloadable target document in the active content;
when there is a downloadable document, then downloading the target document and parsing or having parsed selected data in the target document;
wherein the extracting step comprises
extracting or having extracted a first potential key from the active content;
extracting or having extracted a second potential key from parsed content in the target document; and
comparing or requesting comparison the first potential key to the second potential key and when they match, then designating one of the first and second potential keys as the unique key, and when they do not match, then performing the search of the customer database using both of the potential keys as the unique key.

13. The non-transitory computer-readable medium as defined in claim 1, further comprising computer-readable code for performing the steps:
comparing or requesting comparison of text in the active content to a set of predetermined text formats;
when there is a match to one of the text formats, then creating or having created a document;
parsing or having parsed selected data in the document created using the object selector data;
wherein the extracting step comprises
extracting or having extracted a first potential key from the active content; and
extracting or having extracted a second potential key from parsed content in the target document; and
comparing or having compared the first potential key to the second potential key and if they match, then designating one of the first and second potential keys as the unique key, and if they do not match, then performing the search of the customer database using both of the potential keys as the unique key.

14. The non-transitory computer-readable medium as defined in claim 1, wherein the computer-readable code for the searching step is configured to search or have searched the customer database using the unique key and one or more selected from the group of active content metadata and location data.

15. The non-transitory computer-readable medium as defined in claim 1, wherein the new record for the customer database comprises the selected data obtained from the extracting step; and further comprising computer-readable code to send the new document to the customer database.

16. The non-transitory computer-readable medium as defined in claim 1, further comprising computer-readable code for receiving from the customer the object selector data.

17. A computer system, comprising:
one or more computers, where a user computer comprises one of the one or more computers, configured with:
a receiving component configured in the one or more computers to receive active content, where the active content comprises computer code for configuring a display with user-requested content in a first display interface on a display screen of the user computer;
a matching engine configured in the one or more computers, to automatically match or have matched without user intervention selected data from the active content to target category data, wherein the target category data comprises predefined categories of information of interest to a user;
an extraction engine configured in the one or more computers to operate, when there is a match for items of the selected data, to extract data from the active content that matches object selector data, including a unique key;
a search request component configured in the one or more computers to search or send a request to search a customer database of database records using at least the unique key to obtain database records;
a creation and update component configured in the one or more computers to operate:
when there are no database records found or returned from the search operation, then automatically creating or having created without user intervention, a new record comprising a first plurality of fields based at least in part on the selected data extracted from the active content for provision to the customer database;
when there is one database record found or returned from the search operation, then automatically updating or having updated without user intervention when one or more conditions is met, one or more items within the one database record based at least in part on the selected data extracted from the active content, and selecting a second plurality of fields from the one database record;
when there are two or more database records found or returned from the search operation, then automatically determining a primary database record, based on one or more criteria, and automatically updating or having updated without user intervention when one or more conditions is met, one or more items within the primary database record based at least in part on the selected data extracted from the active content, and selecting a third plurality of fields from the primary database record;
a display data generator configured in the one or more computers to create display data based at least in part on the first plurality of fields of the new record, or the second plurality of fields for the one record, or the third plurality of field for the primary record; and
wherein the display displays the display data created in a second display interface on the display screen.

18. The system as defined in claim 17, wherein the creation and update component is configured to create display data comprises computer code for including data for one or more other of the database records from the search that are not the primary database record in the display data, when there are two or more database records.

19. The system as defined in claim 17, wherein the matching engine is further configured to automatically match or have matched source data from the active content to predetermined source data, and only performing the matching operation of the active content to the target category data when there is a match of the source data to an item in the predetermined source data.

20. The system as defined in claim 17, wherein the active content is computer readable code received from a communications module, and wherein the extraction engine further comprises:

- a document detector configured in the one or more computers to determine if there is object selector data for a downloadable target document in the active content;
- a download engine configured in the one or more computers to download the downloadable target document;
- a parsing engine configured in the one or more computers to parse or request parsing of selected data in the target document, and
- wherein the extraction engine is configured: to extract a first potential key from the active content; to extract a second potential key from parsed content of the target document; and to compare the first potential key to the second potential key and when they match, then sending one of the potential keys as the unique key to the search request component to perform the search of the customer database, and when they do not match, then sending both of the potential keys as the unique key to the search request component to perform the search of the customer database.

21. The system as defined in claim 17, wherein the extraction engine further comprises:

- a comparator configured in the one or more computers to compare data in the active content to a set of predetermined text formats;
- a document creator engine configured to create a document when there is a match to one of the text formats;
- a parsing engine configured in the one or more computers to parse or request parsing of selected data in the document created using the object selector data, and
- wherein the extraction engine is configured in the one or more computers: to extract a first potential key from the active content; to extract a second potential key from parsed content of the document created; and to compare the first potential key to the second potential key and when they match, then sending one of the potential keys as the unique key to the search request component to perform the search of the customer database, and when they do not match, then sending both of the potential keys as the unique key to the search request component to perform the search of the customer database.

22. The system as defined in claim 17, wherein the creation and update component is further configured:

- to obtain update date for the one record or the primary record returned; and
- to compare or have compared the update date for the respective record to a date associated with the active data, and only triggering the updating or having updated operation when date associated with the active data is after the update date for the respective record.

* * * * *